United States Patent
Yao et al.

(10) Patent No.: US 11,987,886 B2
(45) Date of Patent: May 21, 2024

(54) PREPARATION METHOD FOR TUNGSTEN/GADOLINIUM OXIDE FUNCTIONAL FIBER HAVING CORE-SHELL STRUCTURE FOR X AND GAMMA RAY PROTECTION

(71) Applicant: NANTONG UNIVERSITY, Jiangsu (CN)

(72) Inventors: Lirong Yao, Jiangsu (CN); Yong Xia, Jiangsu (CN); Tao Yang, Jiangsu (CN); Tong Sun, Jiangsu (CN); Gangwei Pan, Jiangsu (CN); Sijun Xu, Jiangsu (CN); Tao Ji, Jiangsu (CN); Qiang Gao, Jiangsu (CN)

(73) Assignee: NANTONG UNIVERSITY, Jiangsu (CN)

( * ) Notice: Subject to any disclaimer, the term of this patent is extended or adjusted under 35 U.S.C. 154(b) by 0 days.

(21) Appl. No.: 18/276,053

(22) PCT Filed: Aug. 16, 2021

(86) PCT No.: PCT/CN2021/112684
§ 371 (c)(1),
(2) Date: Aug. 7, 2023

(87) PCT Pub. No.: WO2022/166151
PCT Pub. Date: Aug. 11, 2022

(65) Prior Publication Data
US 2024/0093374 A1    Mar. 21, 2024

(30) Foreign Application Priority Data

Feb. 8, 2021 (CN) .......................... 202110179974.0

(51) Int. Cl.
| | | |
|---|---|---|
| C23C 18/12 | (2006.01) | |
| B22F 1/16 | (2022.01) | |
| C03B 37/012 | (2006.01) | |
| C23C 18/04 | (2006.01) | |
| D01F 1/10 | (2006.01) | |
| D01F 6/06 | (2006.01) | |
| G21F 1/10 | (2006.01) | |

(52) U.S. Cl.
CPC ............ *C23C 18/1241* (2013.01); *B22F 1/16* (2022.01); *C03B 37/01265* (2013.01); *C23C 18/04* (2013.01); *C23C 18/1216* (2013.01); *D01F 1/10* (2013.01); *D01F 6/06* (2013.01); *G21F 1/106* (2013.01); *C03B 2201/34* (2013.01); *C03B 2201/40* (2013.01)

(58) Field of Classification Search
CPC .................................................. C23C 18/1216
See application file for complete search history.

(56) References Cited

FOREIGN PATENT DOCUMENTS

| | | |
|---|---|---|
| CN | 103463648 | 12/2013 |
| CN | 104532381 | 4/2015 |
| CN | 107052356 | 8/2017 |
| CN | 110038614 | 7/2019 |
| CN | 110219069 | 9/2019 |
| CN | 111250697 | 6/2020 |
| CN | 112831078 | 5/2021 |
| CN | 112831855 | 5/2021 |
| CN | 112846173 | 5/2021 |
| CN | 112900110 | 6/2021 |
| CN | 112900155 | 6/2021 |

OTHER PUBLICATIONS

"International Search Report (Form PCT/ISA/210) of PCT/CN2021/112684", mailed on Nov. 4, 2021, with English translation thereof, pp. 1-6.

"Written Opinion of the International Searching Authority (Form PCT/ISA/237) of PCT/CN2021/112684", mailed on Nov. 4, 2021, pp. 1-5.

Peng Zhang et al., "Shielding composites for neutron and gamma-radiation with Gd2O3@W core-shell structured particles," Materials Letters, vol. 276, Jun. 2020, pp. 1-4.

*Primary Examiner* — Peter F Godenschwager
(74) *Attorney, Agent, or Firm* — JCIPRNET

(57) ABSTRACT

The present application provides a preparation method for a core-shell structured tungsten/gadolinium oxide functional fiber for X and γ ray protection, comprising: first preparing a core-shell structured tungsten/gadolinium oxide powder; preparing a W@Gd$_2$O$_3$/PP blended melt from the powder; and preparing a W@Gd$_2$O$_3$/PP composite fiber from the blended melt. The core-shell structured tungsten/gadolinium oxide functional fiber prepared by the method can play a role in synergistic protection in the aspect of radiation protection, eliminate a weak protection area, and effectively absorb secondary radiation generated by radiation. Secondly, the prepared functional fiber has the characteristics of no lead and light weight, and has good application prospects in the aspect of X and γ ray radiation protection.

15 Claims, 1 Drawing Sheet

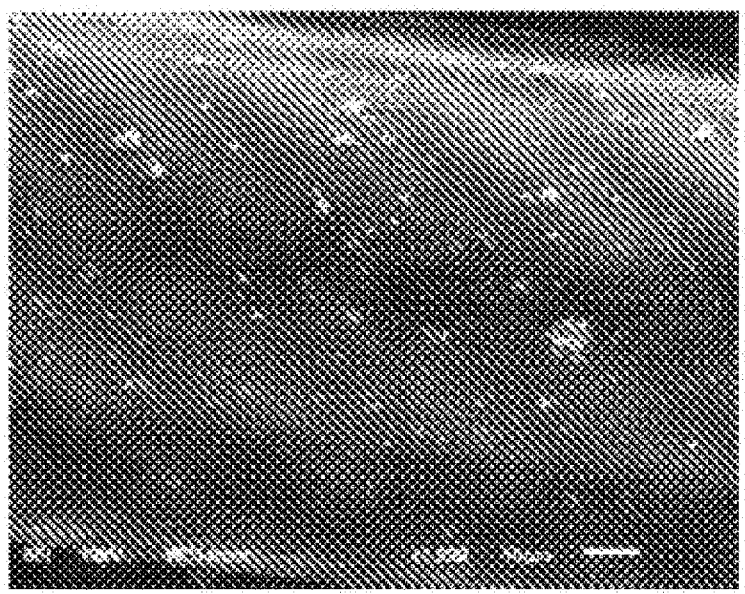

PREPARATION METHOD FOR TUNGSTEN/GADOLINIUM OXIDE FUNCTIONAL FIBER HAVING CORE-SHELL STRUCTURE FOR X AND GAMMA RAY PROTECTION

CROSS-REFERENCE TO RELATED APPLICATION

The present application is a 371 of international application of PCT application serial no. PCT/CN2021/112684, filed on Aug. 16, 2021, which claims priority to Chinese Patent Application No. 202110179974.0, filed on Feb. 8, 2021, and entitled "PREPARATION METHOD FOR CORE-SHELL STRUCTURED TUNGSTEN/GADOLINIUM OXIDE FUNCTIONAL FIBER FOR X AND γ RAY PROTECTION", which is incorporated herein by reference in its entirety.

BACKGROUND

Technical Field

The present application relates to the field of radiation protection, and in particular, to a preparation method for a core-shell structured tungsten/gadolinium oxide functional fiber for X and γ ray protection.

Description of Related Art

The development of nuclear technology brings convenience to people but also produces a lot of radiation hazards. Lightweight, flexible and excellent protection-performance textiles for radiation protection are the hotspot of current research. Radiation protection materials are mainly divided into leaded materials and lead-free materials. Leaded materials are mainly lead. Although having excellent protective effect, they are toxic, have poor strength, and scatter low-energy X rays significantly. Lead-free materials mainly include composite materials made of rare earth elements and compounds of heavy metals, such as tin, tungsten, and bismuth, which have excellent protective effects and are lightweight and safe.

In recent years, micro-nano core-shell materials having special structures have attracted widespread attention. Composite particles having different core-shell micro-structures will have unique physical and chemical properties, which also lead to their broad application prospects in many fields, such as optics, electronics, catalysis, biology, and radiation. In terms of radiation protection, compared with the physical blending of single metals, the core-shell structured radiation protection materials can function for synergistic protection, eliminating a weak protection area while effectively absorbing secondary radiation generated by radiation. Preparation methods for the core-shell structures mainly include the template method, the precipitation method, the hydrothermal synthesis method, the spray drying method, the layer-by-layer self-assembly technology, etc. Li et al. prepared gadolinium oxide hollow spheres with controllable shell thickness, with silica as a template, by the homogeneous precipitation method. However, these methods have disadvantages such as many processes and time-consuming, and therefore, it is necessary to develop an effective and simple method to overcome these defects. Adhesion proteins secreted by mussels have strong adhesion ability. Inspired by this, the MesserSmith research group of Northwestern University in the United States discovered in 2007 that dopamine (DA) can oxidize and self-polymerize into polydopamine on the surface of any material under the weak alkaline condition of simulated seawater. The polymerization conditions are simple and controllable, and polydopamine has excellent adhesion, hydrophilicity, stability and biocompatibility. Also, there are a large number of phenolic hydroxyl and amino active groups on polydopamine, which provide abundant active sites for the complexation of metal ions.

SUMMARY

The objective of the present application is to provide a preparation method for a functional fiber for X and γ ray protection in order to overcome the above defects of the prior art.

The objective of the present application can be achieved by the following technical solutions.

The present application provides a preparation method for a functional fiber for X and γ ray protection. The method comprises the following steps:

(1) preparing a dopamine salt solution, adding a buffer to adjust the pH value, then adding tungsten powder, and stirring, filtering, washing and drying, to obtain W@PDA;

(2) adding the W@PDA obtained in the step (1) into a gadolinium nitrate solution, and stirring, filtering, and high-temperature calcining, to obtain a core-shell structured W@$Gd_2O_3$ powder;

(3) adding the core-shell structured W@$Gd_2O_3$ powder obtained in the step (2) and a dried PP masterbatch sequentially into a feed port of a screw extruder to obtain a core-shell structured W@$Gd_2O_3$/PP blended melt, which is cooled in air and brittle fractured and granulated; and (4) adding the dried blended particles obtained in the step (3) into a feed port of a screw extruder, and then passing the extruded melt through a drawing and winding device and stretching the same to form a composite fiber.

According to the present application, for the preparing a dopamine salt solution described in the step (1), the concentration of the solution should be controlled at 1.5-2.5 g/L. The main reason is that when the concentration of DA is lower than 1.5 g/L, only a small amount of PDA particles are deposited on the surface of W, and when the concentration of DA is 1.5-2.5 g/L, a PDA film can be formed on the surface of the W powder. When the concentration of DA is higher than 2.5 g/L, DA self-polymerizes on the surface of the W powder to form larger PDA particles due to high concentration of DA, which is not conducive to subsequent adsorption of gadolinium ions.

It is worth noting that, in the step (1), after the dopamine salt solution is prepared, a tris buffer should be added into the system to adjust the pH value of the solution to 8-9. This is because that dopamine can self-polymerize into polydopamine under a weak alkaline and aerobic condition, and polydopamine has extraordinary surface activity and adhesion on the surface of different materials, which can provide a platform for secondary functionalization of the materials.

Further, the stirring described in the step (1) comprises stirring with an electric stirrer for 18-24 h.

In addition, the washing described in the step (1) comprises washing for 2-3 times with water and ethanol respectively.

Also, the specific conditions of the drying described in the step (1) are not specifically limited, as long as the purpose of drying the sample can be achieved.

According to the present application, for the gadolinium nitrate solution described in the step (2), the concentration of the solution should be controlled at 0.3-0.5 M/L. This is because that when the concentration of Gd+ is 0.02 M/L, the surface of W is coated with a small amount of sparse dot-like $Gd_2O_3$ nano-particles. When the concentration of Gd+ is increased to 0.1 M/L, the $Gd_2O_3$ nano-particles on the surface of W become larger and are increased, because the $Gd_2O_3$ nano-particles are combined with each other to form larger $Gd_2O_3$ particles due to the increase of the Gd+ concentration. When the concentration of Gd+ is increased to 0.2 M/L, the $Gd_2O_3$ nano-particles on the surface of W become even larger and denser. As the concentration of Gd+ increases to 0.3 M/L, the $Gd_2O_3$ nano-particles on the surface of W are combined with each other to form core-shell structured $W@Gd_2O_3$. After the concentration of Gd+ is increased to 0.4 M/L, the $Gd_2O_3$ nano-particles on the surface of W change little as compared to the Gd+ concentration of 0.3 M/L. This is because that the chelation of Gd+ by polydopamine on the surface of W has reached saturation when the concentration of Gd+ is 0.3 M/L, and too high concentration will cause waste.

Further, the stirring described in the step (2) is not specifically limited, and it is only necessary to magnetically stir for a certain period of time.

In addition, the high-temperature calcining described in the step (2) comprises calcining in a muffle furnace at 800-1000° C. for 2-3 h, with a heating rate of 2-4° C./min. In order to avoid formation of impurities during reaction, the calcining described in the step (2) in the present application is carried out in a protective gas. The protective gas includes nitrogen or an inert gas. The inert gas can be argon, helium, etc., and there is no specific limitation on this in the present application.

According to the present application, the PP masterbatch described in the step (3) is dried in an oven at 40-60° C. for 30-60 min.

In addition, the screw extruder described in the step (3) has an extrusion temperature of 100° C., and a screw rotation speed of 15 r/min.

According to the present application, the blended particles described in the step (4) are dried in an oven at 40-60° C. for 30-60 min.

It is worth noting that, the screw extruder described in the step (4) has a screw zone temperature of 100° C., a screw rotation speed of 20 r/min, a spinneret orifice temperature of 85° C., an extrusion speed of 7-8 mm/min, and a spinneret orifice diameter of 2 mm.

In addition, the drawing and winding device described in the step (4) has a drawing speed of 150 r/min.

As a preferred technical solution, a preparation method for a functional fiber for X and γ ray protection provided by the present application comprises the following steps:

(1) preparing a dopamine salt solution with a concentration range of 1.5-2.5 g/L, adding a tris buffer to adjust the pH to 8-9, then adding tungsten powder cleaned up with ethanol, and stirring with an electric stirrer for 18-24 h, then filtering and separating, and washing for 2-3 times with deionized water and ethanol respectively, and then drying, to obtain W@PDA;

(2) adding the W@PDA obtained in the step (1) to a gadolinium nitrate solution with a concentration range of 0.3-0.5 M/L, magnetically stirring for a certain period of time, then filtering and separating, and drying, and then high-temperature calcining the prepared sample at 800-1000° C. with charged nitrogen for 2-3 h (with a heating rate of 2-4° C./min), and finally obtaining a core-shell structured $W@Gd_2O_3$ powder;

(3) adding the core-shell structured $W@Gd_2O_3$ powder obtained in the step (2) and a dried PP masterbatch sequentially into a feed port of a screw extruder with an extrusion temperature of 100° C. and a screw rotation speed of 15 r/min, to obtain a core-shell structured $W@Gd_2O_3$/PP blended melt, which is cooled in air and brittle fractured and granulated; and (4) adding the dried blended particles obtained in the step (3) into a feed port of a screw extruder with a screw zone temperature of 100° C., a screw rotation speed of 20 r/min, a spinneret orifice temperature of 85° C., an extrusion speed of 7-8 mm/min, and a spinneret orifice diameter of 2 mm, and then passing the extruded melt through a drawing and winding device and stretching the same at a drawing speed of 150 r/min to form a composite fiber.

Compared with the blended powder of tungsten and gadolinium oxide, the core-shell structured $W@Gd_2O_3$ powder prepared using the above preferred technical solution has a core-shell structure which can function for a synergistic protection effect in radiation protection, eliminating a weak protection area while effectively absorbing secondary radiation generated by radiation.

Compared with the existing technical solution, the present application has at least the following beneficial effects:

The present application first utilizes the fact that dopamine can self-polymerize into polydopamine under a weak alkaline and aerobic condition, and polydopamine has extraordinary adhesion on the surface of different materials, and can successfully coat tungsten to obtain W@PDA.

PDA contains a large number of polar groups such as phenolic hydroxyl groups and amino groups on the surface, which provide abundant active sites for complexing various metal ions, and can effectively chelate with Gd+ in the gadolinium nitrate solution. After the high-temperature calcining, PDA forms a nitrogen-doped carbon layer adhered to the surface of tungsten, while W@PDA chelated with Gd+ is transformed into $W@Gd_2O_3$.

BRIEF DESCRIPTION OF THE DRAWINGS

FIG. 1s a scanning electron microscope image of a $W@Gd_2O_3$ powder of a functional fiber for X and γ ray protection prepared in Example 1.

DESCRIPTION OF THE EMBODIMENTS

In order to better illustrate the present application and facilitate understanding of the technical solutions of the present application, some typical but non-limiting embodiments of the present application are given below:

Example 1

The present example provides a preparation method for a functional fiber for X and γ ray protection. The method comprises the following steps:

(1) A dopamine salt solution with a concentration of 2 g/L was prepared, into which a tris buffer was added to adjust the pH value of the solution to 8.5, then a tungsten powder cleaned up with ethanol was added, and stirred with an electric stirrer for 24 h, then the product was filtered and separated, and then washed for 2 times with deionized water and ethanol respectively, and dried at 80° C. for 5 h, to obtain W@PDA.

(2) The W@PDA obtained in the step (1) was added into a gadolinium nitrate solution with a concentration of 0.3 M/L, magnetically stirred for 2 h, then the product was filtered and separated, and dried at 80° C. for 5 h, and then the prepared sample was high-temperature calcined at 800° C. with charged nitrogen for 2 h (with a heating rate of 2° C./min), and finally a core-shell structured W@Gd$_2$O$_3$ powder was obtained.

(3) The core-shell structured W@Gd$_2$O$_3$ powder obtained in the step (2) and a dried PP masterbatch were sequentially added into a feed port of a screw extruder with an extrusion temperature of 100° C. and a screw rotation speed of 15 r/min, to obtain a core-shell structured W@Gd$_2$O$_3$/PP blended melt, which was cooled in air and brittle fractured and granulated.

(4) The dried blended particles obtained in the step (3) were added into a feed port of a screw extruder with a screw zone temperature of 100° C., a screw rotation speed of 20 r/min, a spinneret orifice temperature of 85° C., an extrusion speed of 7 mm/min, and a spinneret orifice diameter of 2 mm, and then the extruded melt was passed through a drawing and winding device and stretched at a drawing speed of 150 r/min to form a composite fiber.

The W@Gd$_2$O$_3$ powder prepared in this example was scanned by SEM, and the resulting photograph is shown in FIGURE. It can be seen from the figure that a PDA film is formed on the surface of the W powder.

Example 2

The present example provides a preparation method for a functional fiber for X and γ ray protection. The method comprises the following steps:

(1) A dopamine salt solution with a concentration of 1.5 g/L was prepared, into which a tris buffer was added to adjust the pH value of the solution to 8, then a tungsten powder cleaned up with ethanol was added, and stirred with an electric stirrer for 20 h, then the product was filtered and separated, and then washed for 3 times with deionized water and ethanol respectively, and dried at 60° C. for 8 h, to obtain W@PDA.

(2) The W@PDA obtained in the step (1) was added into a gadolinium nitrate solution with a concentration of 0.35 M/L, magnetically stirred for 3 h, then the product was filtered and separated, and dried at 60° C. for 8 h, and then the prepared sample was high-temperature calcined at 900° C. with charged nitrogen for 2.5 h (with a heating rate of 3° C./min), and finally a core-shell structured W@Gd$_2$O$_3$ powder was obtained.

(3) The core-shell structured W@Gd$_2$O$_3$ powder obtained in the step (2) and a dried PP masterbatch were sequentially added into a feed port of a screw extruder with an extrusion temperature of 100° C. and a screw rotation speed of 15 r/min, to obtain a core-shell structured W@Gd$_2$O$_3$/PP blended melt, which was cooled in air and brittle fractured and granulated.

(4) The dried blended particles obtained in the step (3) were added into a feed port of a screw extruder with a screw zone temperature of 100° C., a screw rotation speed of 20 r/min, a spinneret orifice temperature of 85° C., an extrusion speed of 7.5 mm/min, and a spinneret orifice diameter of 2 mm, and then the extruded melt was passed through a drawing and winding device and stretched at a drawing speed of 150 r/min to form a composite fiber.

Example 3

The present example provides a preparation method for a functional fiber for X and γ ray protection. The method comprises the following steps:

(1) A dopamine salt solution with a concentration of 2.5 g/L was prepared, into which a tris buffer was added to adjust the pH value of the solution to 9, then a tungsten powder cleaned up with ethanol was added, and stirred with an electric stirrer for 18 h, then the product was filtered and separated, and then washed for 2 times with deionized water and ethanol respectively, and dried at 70° C. for 6 h, to obtain W@PDA.

(2) The W@PDA obtained in the step (1) was added into a gadolinium nitrate solution with a concentration of 0.4 M/L, magnetically stirred for 2.5 h, then the product was filtered and separated, and dried at 70° C. for 6 h, and then the prepared sample was high-temperature calcined at 1000° C. with charged nitrogen for 3 h (with a heating rate of 4° C./min), and finally a core-shell structured W@Gd$_2$O$_3$ powder was obtained.

(3) The core-shell structured W@Gd$_2$O$_3$ powder obtained in the step (2) and a dried PP masterbatch were sequentially added into a feed port of a screw extruder with an extrusion temperature of 100° C. and a screw rotation speed of 15 r/min, to obtain a core-shell structured W@Gd$_2$O$_3$/PP blended melt, which was cooled in air and brittle fractured and granulated.

(4) The dried blended particles obtained in the step (3) were added into a feed port of a screw extruder with a screw zone temperature of 100° C., a screw rotation speed of 20 r/min, a spinneret orifice temperature of 85° C., an extrusion speed of 8 mm/min, and a spinneret orifice diameter of 2 mm, and then the extruded melt was passed through a drawing and winding device and stretched at a drawing speed of 150 r/min to form a composite fiber.

The above description of the embodiments is intended to facilitate those of ordinary skill in the technical art to understand and use the invention. It is obvious that those skilled in the art can easily make various modifications to these embodiments, and apply the general principles described herein to other embodiments without creative effort. Therefore, the present application is not limited to the above embodiments. All improvements and modifications made by those skilled in the art from the disclosure of the present application without departing from the scope of the present application should fall within the protection scope of the present application.

What is claimed is:

1. A preparation method for a core-shell structured tungsten/gadolinium oxide functional fiber for X and γ ray protection, comprising the following steps:
    (1) preparing a dopamine salt solution, adding a buffer to adjust the pH value, then adding tungsten powder, and stirring, filtering, washing and drying, to obtain W@PDA;
    (2) adding the W@PDA obtained in the step (1) into a gadolinium nitrate solution, and stirring, filtering, and high-temperature calcining, to obtain a core-shell structured W@Gd$_2$O$_3$ powder;
    (3) adding the core-shell structured W@Gd$_2$O$_3$ powder obtained in the step (2) and a dried PP masterbatch sequentially into a feed port of a screw extruder to obtain a core-shell structured W@Gd$_2$O$_3$/PP blended melt, which is cooled in air and brittle fractured and granulated, to obtain dried blended particles; and
    (4) adding the dried blended particles obtained in the step (3) into a feed port of a screw extruder, and passing the extruded melt through a drawing and winding device and stretching the same to form a composite fiber.

2. The preparation method for a core-shell structured tungsten/gadolinium oxide functional fiber for X and γ ray protection of claim 1, wherein the buffer in the step (1) is tris, and the pH value is 8-9.

3. The preparation method for a core-shell structured tungsten/gadolinium oxide functional fiber for X and γ ray protection of claim 1, wherein the tungsten powder in the step (1) is tungsten powder cleaned with ethanol.

4. The preparation method for a core-shell structured tungsten/gadolinium oxide functional fiber for X and γ ray protection of claim 1, wherein the stirring in the step (1) is stirring for 18-24 h with an electric stirrer.

5. The preparation method for a core-shell structured tungsten/gadolinium oxide functional fiber for X and γ ray protection of claim 1, wherein the washing in the step (1) is washing for 2-3 times with deionized water and ethanol respectively.

6. The preparation method for a core-shell structured tungsten/gadolinium oxide functional fiber for X and γ ray protection of claim 1, wherein the dopamine salt solution in the step (1) has a concentration of 1.5 g/L-2.5 g/L.

7. The preparation method for a core-shell structured tungsten/gadolinium oxide functional fiber for X and γ ray protection of claim 1, wherein the high-temperature calcining in the step (2) has a calcining temperature of 800-1000° C., a calcining time of 2-3 h, and a heating rate of 2-4° C./min.

8. The preparation method for a core-shell structured tungsten/gadolinium oxide functional fiber for X and γ ray protection of claim 1, wherein the calcining in the step (2) is carried out in a protective gas, which is nitrogen or an inert gas.

9. The preparation method for a core-shell structured tungsten/gadolinium oxide functional fiber for X and γ ray protection of claim 1, wherein the gadolinium nitrate solution in the step (2) has a concentration of 0.3-0.5 M/L.

10. The preparation method for a core-shell structured tungsten/gadolinium oxide functional fiber for X and γ ray protection of claim 1, wherein the PP masterbatch in the step (3) is dried in an oven at 40-60° C. for 30-60 min.

11. The preparation method for a core-shell structured tungsten/gadolinium oxide functional fiber for X and γ ray protection of claim 1, wherein the screw extruder in the step (3) has an extrusion temperature of 100° C. and a screw rotation speed of 15 r/min.

12. The preparation method for a core-shell structured tungsten/gadolinium oxide functional fiber for X and γ ray protection of claim 1, wherein the blended particles in the step (4) are dried in an oven at 40-60° C. for 30-60 min.

13. The preparation method for a core-shell structured tungsten/gadolinium oxide functional fiber for X and γ ray protection of claim 1, wherein the screw extruder in the step (4) has a screw zone temperature of 100° C., a screw rotation speed of 20 r/min, a spinneret orifice temperature of 85° C., an extrusion speed of 7-8 mm/min, and a spinneret orifice diameter of 2 mm.

14. The preparation method for a core-shell structured tungsten/gadolinium oxide functional fiber for X and γ ray protection of claim 1, wherein the drawing and winding device in the step (4) has a drawing speed of 150 r/min.

15. The preparation method for a core-shell structured tungsten/gadolinium oxide functional fiber for X and γ ray protection of claim 1, wherein the method comprises the following steps:
   (1) preparing a dopamine salt solution with a concentration of 1.5 g/L-2.5 g/L, adding a tris buffer to adjust the pH to 8-9, then adding tungsten powder cleaned up with ethanol, and stirring with an electric stirrer for 18-24 h, then filtering and separating, and washing for 2-3 times with deionized water and ethanol respectively, and then drying, to obtain W@PDA;
   (2) adding the W@PDA obtained in the step (1) to a gadolinium nitrate solution with a concentration of 0.3-0.5 M/L, magnetically stirring for a certain period of time, then filtering and separating, and drying, and then high-temperature calcining the prepared sample at 800-1000° C. with charged nitrogen for 2-3 h (with a heating rate of 2-4° C./min), and finally obtaining a core-shell structured W@Gd$_2$O$_3$ powder;
   (3) adding the core-shell structured W@Gd$_2$O$_3$ powder obtained in the step (2) and a dried PP masterbatch sequentially into a feed port of a screw extruder with an extrusion temperature of 100° C. and a screw rotation speed of 15 r/min, to obtain a core-shell structured W@Gd$_2$O$_3$/PP blended melt, which is cooled in air and brittle fractured and granulated, to obtain dried blended particles; and
   (4) adding the dried blended particles obtained in the step (3) into a feed port of a screw extruder with a screw zone temperature of 100° C., a screw rotation speed of 20 r/min, a spinneret orifice temperature of 85° C., an extrusion speed of 7-8 mm/min, and a spinneret orifice diameter of 2 mm, and then passing the extruded melt through a drawing and winding device and stretching the same at a drawing speed of 150 r/min to form a composite fiber.

* * * * *